April 18, 1961     M. A. SMITH     2,980,628
APPARATUS FOR THE MANUFACTURE OF SPHERICAL PARTICLES
Filed July 25, 1958
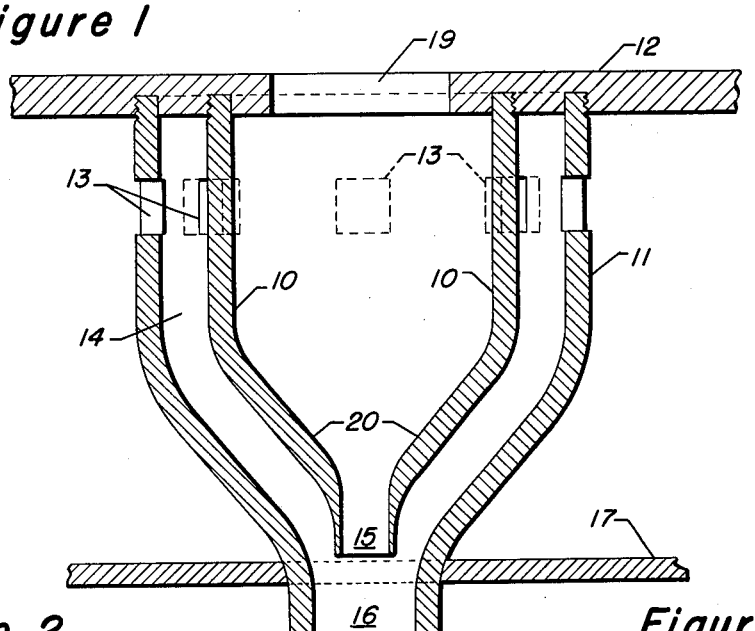
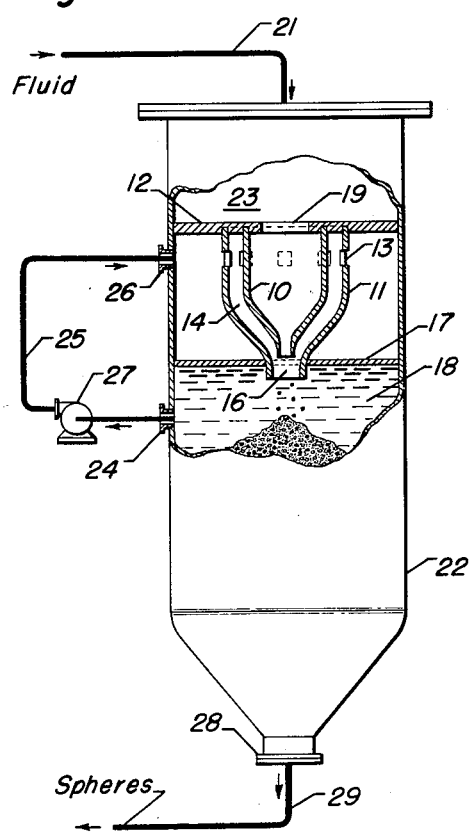
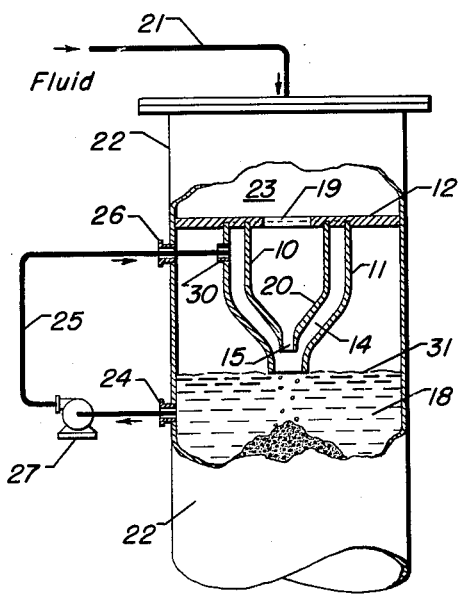
INVENTOR:
Marvin A. Smith
BY: Chester J. Giuliani
Philip J. Liggett
ATTORNEYS United States Patent Office 2,980,628
Patented Apr. 18, 1961

2,980,628

APPARATUS FOR THE MANUFACTURE OF SPHERICAL PARTICLES

Marvin A. Smith, Shreveport, La., assignor, by mesne assignments, to Universal Oil Products Company, Des Plaines, Ill., a corporation of Delaware Filed July 25, 1958, Ser. No. 750,932

3 Claims. (Cl. 252—359)

The present invention relates to the process of manufacturing spherical particles, and is specifically directed to a novel apparatus and the method of utilizing the same in processes wherein a fluid state, of the material to be shaped into spheres, is dispersed as droplets into a suitable gelling medium. Particular benefits are afforded those processes which utilize superatmospheric pressures during the formation of spheroidal particles.

Many substances, presently being utilized for a multitude of purposes, and manufactured in a wide variety of commercial industries, take the form of spheroids or substantially spherical particles. The advantages of spherically shaped particles are obvious and well known, and are rather thoroughly described in the prior art relating thereto. Regardless of the particular industry, process or specific method of manufacture, the spherical particles are generally formed from a fluid state of the particular material, such as, from a liquid, a hydrosol, or, in the case of metallic substances, from the molten metal, etc. The particular method generally involves dispersing the fluid, in the form of droplets, into a suitable gelling medium; the droplets gradually take on a substantially spherical shape while traversing therethrough. Various processes utilize different liquids, or gelling media, into which the substance, desired to exist ultimately in the form of spherical particles, is dispersed or dropped. These liquids are dependent upon the individual characteristics of the process and method, the material to be formed into spheres, the desired physical properties to be imparted to the final product, etc. Various gelling agents are employed, and include water, aqueous solutions of various salts, hydrogenated oils of different consistencies, glycols, etc. The utilization of any particular gelling agent, in any given process which involves the formation of substantially spherical particles, is not essential to the method of the present invention; as hereinabove set forth, the present invention relates to a particular apparatus for use in such processes, and is concerned primarily with the utilization of such apparatus in a particular manner.

Although the apparatus and method of the present invention may be employed to advantage in many industries and in a variety of processes, among which are the pharmaceutical, for the production of drugs and vitamins; the petroleum for the manufacture of catalysts and carriers thereof, etc., in the interest of simplicity, the following discussion will be restricted to a single process in a particular industry. It is understood that this restriction is for the sole purpose of illustration and definiteness, and is not intended to limit unduly the present invention beyond the scope and spirit of the appended claims. It is further understood that the use of the apparatus, as hereinafter described, is not meant to be limited to the particular embodiments set forth; other methods of employing the apparatus, and insignificant modifications thereof, will be readily ascertained by those skilled in the art.

The petroleum and chemical industries depend to an indeterminable extent upon the effective promotion of a multitude of chemical reactions, or a particular reaction from a select group of reactions, and employ many various catalytic materials in the furtherance thereof. Usually, the catalytically active components of the catalysts are composited with a suitable refractory inorganic oxide carrier material, and the finished catalyst generally takes the form of spheres. The refractory oxides most frequently employed are selected from the group consisting of alumina, silica, zirconia, thoria, mixtures thereof, etc. There are many advantages to the utilization of the refractory material in spheroidal form, and, in the manufacture of such spherical particles, a hydrous inorganic oxide sol, such as an alumina hydrosol, is generally prepared. The sol is subsequently dispersed, in the form of droplets, into a suitable gelling medium in which the droplets assume a spherical shape, and, while traversing through said gelling medium, become set into semi-solid hydrogel spheroids. The semi-solid spheroids are subsequently subjected to one or more specific aging treatments for the purpose of imparting certain desired physical characteristics thereto. It has recently been found to be of advantage to effect the various aging treatments at superatmospheric pressures, and to combine the forming and aging process into a unitary process in which the forming and subsequent aging of the hydrogel spheroids may be readily effected continuously.

The present method, utilized for the production of refractory inorganic oxide spheres, employs a novel apparatus comprising a dropping head which supports a plurality of dropping tips, each of the latter exuding a stream of the hydrosol as droplets from above and into an oil bath. Under certain conditions of temperature and pressure, the droplets take on a substantially spherical shape and gradually set into firm hydrogel spheroids within the oil bath. It is acknowledged that better operation is effected when the dropping head is suspended just above the oil level, and it is essential, to the formation of substantially uniform spheres, that the oil level does not come in contact with the lower extremity of the dropping tip. The control of the distance of suspension is especially critical to the operation, and becomes more critical when superatmospheric pressures are imposed upon the system. Of particular difficulty, with regard to the critical distance between the lower extremity of the dropping tip and the oil level, is the control of the level of the gelling medium so that it is always maintained out of contact with the lower extremity of the dropping tip, while maintaining the distance between the dropping tip and the level of the gelling medium constant. The method of the present invention employs the same materials and equipment heretofore utilized, the substantial change being the modification of the dropping head and dropping tips, which modification is the subject of my invention.

In one embodiment, the present invention provides a novel dropping tip for use in the formation of spherical particles, which dropping tip comprises in combination an inner shell having one end in open communication with a reservoir containing the particular material to be formed into said spherical particles, and having in the other end thereof an opening approximating the size of the particles formed; and an outer shell not in open communication with said reservoir, having an open end extending below the lowest extremity of said inner shell.

In another embodiment, the present invention relates to a sphere-forming dropping head which comprises in combination an upper perforated plate and a lower perforated plate, said upper perforated plate containing a plurality of dropping tips having an inner shell in open communication, through said perforated upper plate, with a reservoir containing the material to be formed into spherical particles, an outer shell attached to said upper plate not in open communication with said reservoir, the lower extremity of said outer shell extending below the lower extremity of said inner shell and through the perforations of said lower plate.

In a specific embodiment, the present invention provides an improvement in processes for the manufacture of hydrogel spheroids under superatmospheric pressure, in which process a hydrosol is passed through a dropping tip into a bath of a suitable gelling medium, being formed into substantially spherical particles and subsequently aged within said gelling medium, which improvement comprises passing the hydrosol into the inner shell of a dropping tip having an outer shell perforated in its upper portion and extending through the lower plate of a dropping head containing a plurality of dropping tips, passing at least a portion of said gelling medium from a point below said lower plate to a point above said lower plate and through the perforations in the upper portion of said outer shell, directing said liquid medium past the lower extremity of said inner shell and carrying droplets of said hydrosol away from the lower extremity of said inner shell through the lower extremity of said outer shell and into the liquid medium below said lower plate.

The apparatus of the present invention, and the method utilizing the same, can best be described through reference to the accompanying drawing. Figure 1 therein is an enlarged sectional view of one particular form in which the dropping tip may be designed, and Figures 2 and 3 illustrate the application of the dropping tip to the process of forming spherical particles. It is understood that the broad scope of the present invention is not to be limited unduly to the particular embodiments illustrated; other embodiments, general refinements and insignificant modifications of the methods illustrated will become apparent to those skilled in the art.

In Figure 1, plate 12, having aperture 19, is the upper plate of a dropping head containing a plurality of dropping tips each of which comprises an inner shell or housing 10. Inner shell 10 is in open communication, through plate 12 via aperture 19, with the reservoir above plate 12 containing the material to be formed into spherical particles. Surrounding inner shell 10 is outer shell 11 of substantially the same shape as the inner shell, and perforated in its upper perion as indicated by perforations 13. The number of such perforations 13, is not critical to either the apparatus or the utilization thereof in the embodiments hereinbefore set forth. As indicated in Figure 3, the upper portion of outer shell 11 may contain a single perforation, designated in Figure 3 as inlet 30, and it is intended to be within the scope of the present invention for outer shell 11 to contain no perforations in the upper portion thereof. The particular shape and/or form of perforations 13 is irrelevant as concerns the dropping tip; that is, the perforations may be substantially square as shown, or they may be circles, ovals, diamonds, slots, oblongs, hexagons, etc. In the particular embodiment illustrated, inner shell 10 forms a conical section in its lower portion 20, which conical section terminates at the extremity thereof in opening 15, through which the material formed into spherical particles passes in the form of droplets. Annular space 14, formed between inner shell 10 and outer shell 11 is of substantially constant cross sectional area except at the lower extremity of inner shell 10, at which point it is preferred to have a slightly smaller cross sectional area in order to increase the rate of flow of oil around the lower extremity of inner shell 10, and past opening 15 (this oil flow is hereinafter described in detail with reference to Figures 2 and 3). It should be noted that the lower extremity of outer shell 11, in open communication through lower plate 17 via aperture 16, extends below opening 15; this defines one of the essential features of the present invention, as hereinafter set forth in detail. In one embodiment of the present invention, lower plate 17 need not necessarily be employed. Also, the plurality of openings 13 in the upper portion of outer shell 11 may be of any suitable number; in one particular embodiment, there exists but a single opening 13.

Figure 2 is illustrative of one embodiment of the method in which the above described apparatus is particularly applicable. For the sake of simplicity, and illustration, the dropping tip has been substantially enlarged, with respect to the forming, and/or forming and aging vessel. It is understood that the preferred method of the present invention would employ a plurality of dropping tips, and not a dropping head containing but a single dropping tip as illustrated. The material to be formed into spherical particles is passed through line 21 into forming tower 22. As hereinbefore set forth the forming tower may be conveniently combined with the aging vessel, or any other vessel necessary in the manufacture of the spherical particles, in which vessel the spherical particles are transported in a substantially vertical direction. The material entering forming tower 22 is contained in reservoir 23 from which it enters the dropping tip through aperture 19 contained in upper plate 12. The material passes in a downwardly direction exuding from the lower extremity of the dropping tip indicated by opening 16. It should be noted that opening 16 extends into and is surrounded by the particular gelling medium 18 employed in forming zone 22. As indicated, the gelling medium 18 is prevented from entering that portion of forming tower 22 between upper plate 12 and lower plate 17. Further, due to an imposed pressure on forming tower 22, or the differential head pressure when the process operates at atmospheric pressure, the oil is prevented from entering opening 16 into annular space 14, contacting thereby the lower extremity of inner shell 10. The forming tower is supplied with outlet 24 through which the gelling medium is pumped in line 25 via pump 27 into inlet 26. The void area surrounding the dropping tips becomes, and remains, filled with the gelling medium entering via inlet 26. As a result of perforations 13 in the upper portion of outer shell 11, the gelling medium enters annular space 14 and is passed therein down and around the lower extremity of inner shell 10, effecting thereby a positive sweeping or suction action which effectively pulls the droplets of fluid from the lower extremity of inner shell 10. The droplets pass through opening 16 into the main body of gelling medium 18, and ultimately are removed from forming tower 22 through line 29 at oulet 28.

The operation of the present invention as indicated in Figure 3 is substantially identical to that hereinabove described with reference to Figure 2. One important exception exists in the elimination of lower plate 17 from the dropping head. In place of lower plate 17 there is illustrated a surface 31 of gelling medium 18. The gelling medium 18, pumped via pump 27 through line 25 and inlet 26, is passed directly into annular space 14 via a suitable inlet 30 and the continuation of line 25 within forming tower 22. As previously described, the oil is transported past the lower extremity of inner shell 10 and enters the main body of gelling medium 18. Regardless of the exact location of surface 31 with respect to the lower extremity of outer shell 11, the gelling medium cannot rise within annular space 14 thereby contacting the lower extremity of inner shell 10, and of greater import, cannot enter opening 15 and contact prematurely the material to be formed into spherical particles. As illustrated in Figure 3, this is prevented through the positive pressure within annular space 14 resulting from the vapor entrapped therein.

From the foregoing discussion, it is readily ascertained that the apparatus and method of the present invention afford a distinct improvement to processes for the manufacture of spherical particles, and are of particular advantage when employed in those processes effected at superatmospheric pressure. Sensitive and intricate level control has been eliminated without the destruction of of the purpose served thereby. Regardless of the precise location of the level within the upper portion of the forming tower, the gelling medium is maintained out of contact with the material to be formed into spherical particles until the same has left, or is about to be exuded from the dropping tips.

I claim as my invention:

1. An apparatus for use in the manufacture of spherical particles comprising a closed vertical sphere-forming chamber adapted to be maintained under superatmospheric pressure and to contain a gelling liquid in its lower portion, a horizontal plate extending across the upper portion and spaced from the top of said chamber and forming a reservoir with the top of the chamber, means for introducing to said reservoir fluid material to be formed into spherical particles, a dropping tip depending from said plate and comprising an inner shell having an enlarged upper potrion and a conical lower portion terminating in a restricted outlet for droplets at its lower end, an outer shell depending from said plate and of substantially the same shape as and surrounding and spaced from said inner shell and having a restricted bottom outlet at a lower elevation in said chamber than the first-mentioned restricted outlet, the enlarged upper portion of said inner shell being in communication with said reservoir through an opening in said plate and the upper portion of said outer shell being closed to the reservoir by said plate, means for passing gelling liquid through the space between said shells and through said restricted bottom outlet into said forming chamber, and means for removing gelled particles from the lower portion of the chamber.

2. The apparatus of claim 1 further characterized in the provision of means for cyclically circulating gelling liquid from said chamber through the space between said shells and through said bottom outlet back to the chamber.

3. An apparatus for use in the manufacture of spherical particles comprising a closed vertical sphere-forming chamber adapted to be maintained under superatmospheric pressure and to contain a gelling liquid in its lower portion, a horizontal plate extending across the upper portion and spaced from the top of said chamber and forming a reservoir with the top of the chamber, means for introducing to said reservoir fluid material to be formed into spherical particles, a dropping tip depending from said plate and comprising an inner shell having an enlarged upper portion and a conical lower portion terminating in a restricted outlet for droplets at its lower end, an outer shell depending from said plate and of substantially the same shape as and surrounding and spaced from said inner shell and having a restricted bottom outlet at a lower elevation in said chamber than the first-mentioned restricted outlet, the enlarged upper portion of said inner shell being in communication with said reservoir through an opening in said plate and the upper portion of said outer shell being closed to the reservoir by said plate, a second horizontal plate extending across said chamber a short distance above said restricted bottom outlet and forming a closed zone with the first-mentioned plate, an opening in the upper portion of said outer shell providing communication between said closed zone and the space between the inner and outer shells, means for circulating gelling liquid from said chamber below said second plate through said closed zone, the space between said shells and said bottom outlet, and means for removing gelled particles from the lower portion of the chamber.

References Cited in the file of this patent

UNITED STATES PATENTS

| | | |
|---|---|---|
| 1,348,140 | Howell | July 27, 1920 |
| 2,275,154 | Merrill et al. | Mar. 3, 1942 |
| 2,287,029 | Dowdell | June 23, 1942 |
| 2,384,944 | Marisic | Sept. 18, 1945 |
| 2,403,463 | Seliger | July 9, 1946 |
| 2,436,211 | Hart | Feb. 17, 1948 |
| 2,572,998 | Eisner | Oct. 30, 1951 |
| 2,616,857 | Shabaker | Nov. 4, 1952 |
| 2,766,478 | Raley et al. | Oct. 16, 1956 |
| 2,799,897 | Jansen | July 23, 1957 |
| 2,902,455 | Fischer et al. | Sept. 1, 1959 |